(12) United States Patent
Trustee

(10) Patent No.: US 6,296,084 B1
(45) Date of Patent: Oct. 2, 2001

(54) TORQUE TRANSMISSION DEVICE

(75) Inventor: Carl Edward Trustee, Warwickshire (GB)

(73) Assignee: Dunlop Limited, West Midlands (GB)

( * ) Notice: Subject to any disclaimer, the term of this patent is extended or adjusted under 35 U.S.C. 154(b) by 0 days.

(21) Appl. No.: 09/247,100

(22) Filed: Feb. 9, 1999

(30) Foreign Application Priority Data

Oct. 2, 1998 (GB) .................................................. 9821340

(51) Int. Cl.$^7$ .................................................. F16D 55/36
(52) U.S. Cl. ........................................ 188/71.5; 188/73.36
(58) Field of Search ............................... 188/71.5, 73.35, 188/73.36, 73.37

(56) References Cited

U.S. PATENT DOCUMENTS

| 5,485,898 | 1/1996 | Patko . | |
|---|---|---|---|
| 5,908,091 | * 6/1999 | Berwanger | 188/71.5 |
| 5,944,147 | * 8/1999 | Berwanger | 188/71.5 |
| 6,003,641 | * 12/1999 | Boehringer et al. | 188/71.5 |

FOREIGN PATENT DOCUMENTS

97/25548 * 7/1997 (WO) .

* cited by examiner

Primary Examiner—Matthew C. Graham
(74) Attorney, Agent, or Firm—Young & Thompson

(57) ABSTRACT

In a multi-disc torque transmission device such as an aircraft brake assembly in which stator discs are carried by a torque tube and rotor discs are rotatable with a wheel carried by a bearing mounted on an axle, a spacer member provides radial support between the axle and torque tube and said spacer member has a non-rigid, non-cylindrical radially outer surface region which is deformable to bear resiliently against the inner surface of the torque tube.

16 Claims, 3 Drawing Sheets

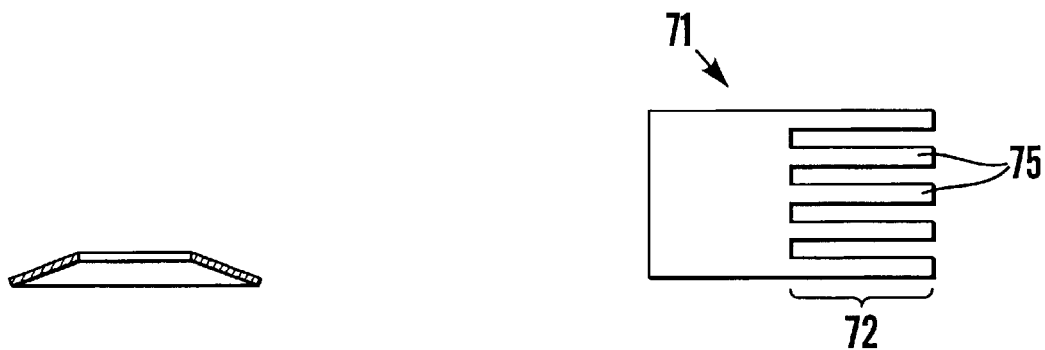
Fig.5
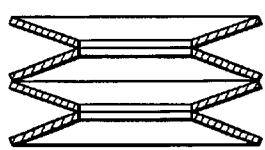
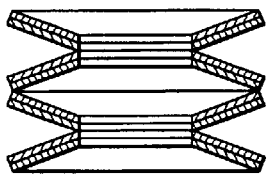
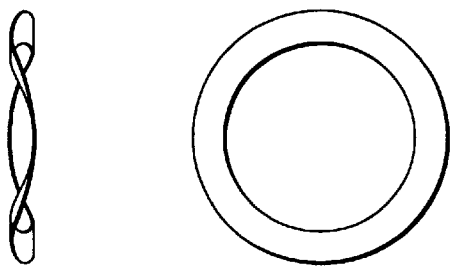
Fig.6a    Fig.6b

TORQUE TRANSMISSION DEVICE

The present invention relates to a torque transmission device such as a brake or clutch. It relates in particular, though not exclusively, to a torque transmission device in the form of a multi-disc brake assembly for an aircraft wheel and to a wheel and brake assembly comprising said torque transmission device.

An aircraft brake assembly typically comprises a torque tube having a splined outer surface on which is mounted a series of stator type friction discs of a material such as steel or carbon. The stator discs are interleaved with rotor discs carried by the aircraft wheel and the interleaved assembly of discs is axially compressible between a series of circumferentially spaced actuation pistons secured to one axial end region of the torque tube and a thrust reaction member at the other end region of the torque tube.

The torque tube is coaxial with a wheel axle relative to which a wheel is rotatably mounted by means of bearings secured to the axle, usually in an annular space between the radially outer surface of the axle and the inner surface of the torque tube.

The torque tube commonly includes a so-called pedestal which extends radially inwards to a foot portion that is supported by the radially outer surface of the axle.

In the aforedescribed construction of a typical aircraft brake assembly the torque tube locates the stator discs, provides a thermal barrier between the brake friction discs and the axle, increases whirl stability and enhances vibration damping in addition to the structural function of transmitting torque during a braking operation.

During a braking operation the torque transmitted by the torque tube can result in a change in the annular configuration of that tube. The torque tube can experience some consequential whirl instability and torsional movement and can also experience squeal vibrations. It is recognised by brake designers that it would be preferable to achieve an improvement in the precision with which the configuration of the torque tube is maintained during braking operations so as to improve whirl stability, increase torsional damping and reduce squeal vibrations.

One proposal for endeavouring to improve the maintenance of the torque tube configuration during braking operations is described in the specification of U.S. Pat. No. 5,485,898. That proposal comprises provision of a spacer member located radially between the torque tube and axle, at a position axially outwards of the conventional pedestal, so as to lie axially between the pedestal and wheel bearings.

The pedestal typically is integral with the torque tube and extends radially inwardly for support by bushing means associated with the axle. The spacer member is located axially between a radially inner region of that pedestal and the wheel bearings. The pedestal also may have a tubular extension which extends outwards towards the axial position of the wheel bearings to lie radially interposed between the spacer member and torque tube.

A cylindrical outer surface of the spacer member is provided with a coating such as aluminium bronze which uniformly contacts and supports the inner diameter surface of the torque tube or a component part associated with the torque tube. The coating may serve to provide improved frictional contact between the spacer member and inner diameter surface of the torque tube. Additionally a support ring may be disposed between the inner diameter surface of the spacer member and the outer diameter surface of the axle, the support ring and spacer member each then including respective splines to effect a splined interconnection which prevents relative rotation of the ring and spacer member. In this construction it is claimed by the prior art teaching that the provision of the spacer member leads to improved torque tube configuration stability and support.

It has now been found that, notwithstanding the alleged benefits of a spacer member and coated surface, there are problems due to fretting and/or galling wear at the contact areas between the spacer member and adjacent surfaces, and including at that interface between the cylindrical radially outer surface of the spacer member and the confronting surface of the torque tube or other component part such as a pedestal extension against which that outer surface lies in contact. Small movements at those interfaces lead to wear and in consequence yet further interface movement during braking operations. As that wear, and hence relative movement, increases there is a progressive reduction in the beneficial effects which the spacer member might otherwise provide.

An object of the present invention is to provide means by which the effectiveness of the spacer member of a torque transmission device such as an aircraft brake assembly may be preserved better during the working life of the device, or at least during the period between normal service operations.

According to the present invention it is taught that the spacer member has a radially outer portion which at least in part defines a non-rigid, non-cylindrical outer surface region that is deformable to bear resiliently against the inner diameter surface of the torque tube, or component part associated with the torque tube.

Said radially outer portion may comprise said deformable region and a substantially non-deformable region. The non-deformable region may have a substantially cylindrical outer surface to confront and optionally also to bear against a confronting surface of the torque tube or component part associated with the torque tube. Alternatively all of said radially outer portion may be non-rigid, with all or at least a part of said outer portion being non-cylindrical. Any said non-deformable region may be at that end region of the radially outer portion which first enters the torque tube on assembly of the spacer member into the torque tube.

The non-rigid, non-cylindrical outer surface region may comprise an outer surface which, in the absence of applied radial force such as that due to a surrounding torque tube, flares outwardly in a direction away from that end region which first enters the torque tube during assembly. Said outer surface may be of a frusto-conical shape, or as considered in axial cross-section it may be concave.

Preferably the deformable portion flares outwardly at an angle in the range 0.1° to 7°, more preferably between 0.2° and 2°.

The non-cylindrical outer surface region may be circumferentially continuous, or it may be discontinuous. It may, for example, comprise a plurality of narrow, axially extending and circumferentially spaced slits which will tend to close as the spacer member is fitted into a torque tube. Thus the discontinuous region may comprise a plurality of resiliently outwardly biassed finger sections which in the assembled condition bear resiliently against an inner surface of the torque tube or component part associated with the torque tube.

The outer surface of said radially outer portion optionally may include a coating or sleeve, which may be of a kind known per se.

The radially outer portion of the spacer member typically is formed of a metallic material such as spring steel, e.g. a spring type stainless steel.

Additionally spring means may be employed to provide an axial force that resiliently loads the interfaces between the torque tube pedestal and the spacer member, and/or between the spacer member and other structure of the torque transmission device, such as wheel bearing means.

The spring means preferably is subject normally to compression load when in use. Preferably the resiliency of the spring means enables it to prevent or at least substantially eliminate relative movement at said interface(s) during normal use.

Examples of suitable spring means include a metal spring, such as a frusto-conical disc spring (known generally as a Belleville washer), or a wave type disc spring or other type of metallic annular spring washer. Alternatively the spring means may be an element, such as a ring-shaped member, of a resilient polymeric or other non-metallic material provided that the temperatures attained in use of the torque transmission device will not damage that material.

Two or more spring means of the same or different types may be used in combination between a pair of confronting abutment surfaces. Thus, for example, a plurality of Belleville washers may be combined in a parallel, nested configuration or in a series arrangement or in a combination of nested and series.

An embodiment of the present invention is described below, by way of example, following a more detailed description of a prior art aircraft brake assembly, each with reference to the Drawings, in which:

FIG. 5 is a side view of another spacer member, and

FIG. 6 shows types of metal springs.

Figure 1:
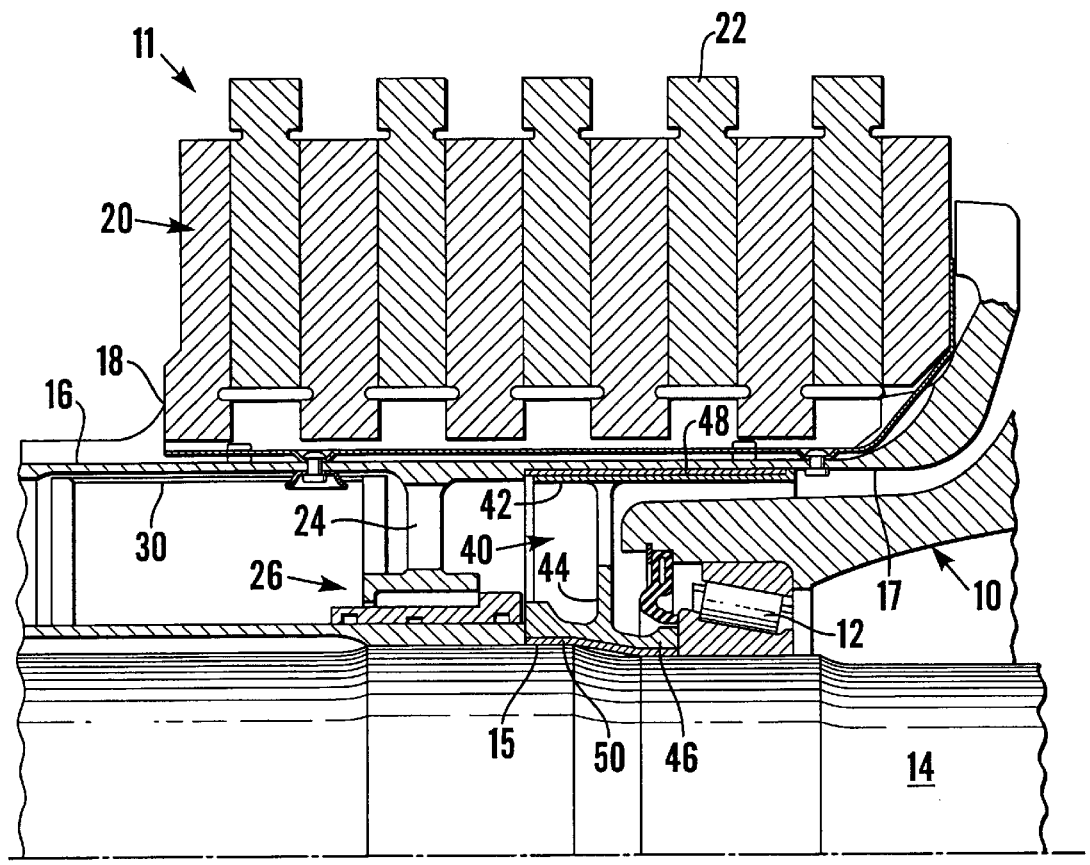
FIG. 1 illustrates a partial section view of a prior art aircraft brake assembly.
Figure 2:
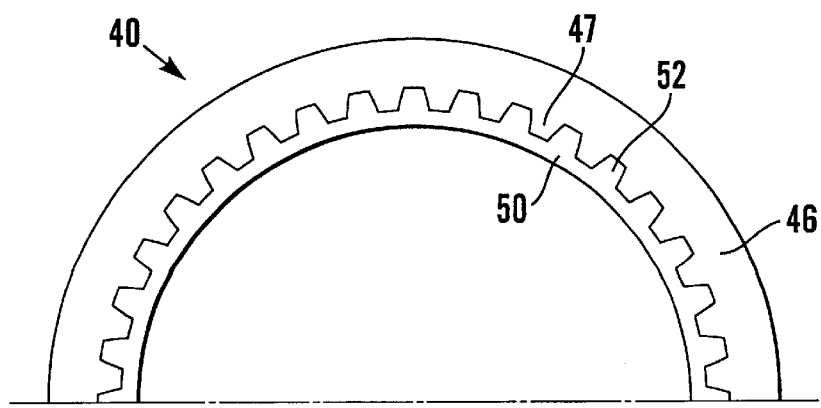
FIG. 2 is a partial end view of the splined interface between the spacer member and support ring of the brake of FIG. 1.

FIG. 1 is a partial section view of an aircraft wheel and brake as shown in U.S. Pat. No. 5,485,898. As is described in that publication, the aircraft wheel, designated generally by reference numeral 10, is supported by bearing means 12 located about an axle 14. Located about axle 14 is an aircraft brake 11 (partially illustrated) having a torque tube 16 (connected with a not shown piston housing) which includes a plurality of splines 18 that connect with slots (not shown) of a plurality of stator discs 20. Interleaved with stator discs 20 is a plurality of rotor discs 22 which engage not shown splines of the wheel. Torque tube 16 includes an integral pedestal 24 located upon a bushing assembly indicated generally by reference numeral 26. A heat shield 30 is located about a portion of the inner diameter surface 17 of torque tube 16. Located between the inner diameter surface 17 of torque tube 16 and the outer diameter surface 15 of axle 14 is a spacer member designated generally by reference numeral 40. Spacer member 40 includes an outer diameter surface of an axially extending portion 42, a radially extending portion 44, and an inner diameter surface of an axially extending portion 46. The outer diameter surface of axially extending portion 42 is described in more detail below and engages and/or supports the inner diameter surface 17 of torque tube 16 (or e.g. an interposed axial extension of the outer part of the pedestal 24). Portion 42 may also include a coating or sleeve 48 for engagement with inner diameter surface 17 of torque tube 16. The coating may be aluminium bronze and the sleeve may be either copper beryllium or aluminium bronze, in order to improve frictional contact with inner diameter surface 17 and to contribute to prevention of galling. The spacer member may be made of stainless steel, and depending on its composition the use of the coating or sleeve 48 is optional. The inner diameter surface of axially extending portion 46 is supported by the outer diameter surface 15 of axle 14, and is retained axially in position by the pedestal 24 and bearing means 12. A support ring 50 may be press fitted on the outer diameter surface of axle 14 so that it is positioned non-rotatably relative to axle 14 and include at its outer diameter a plurality of splines 52 which interface with a plurality of splines 47 (see FIG. 2) on the inner diameter surface of axially extending portion 46, such that support ring 50 and axially extending portion 46 are fixed to one another to prevent rotation therebetween. The ring 50 may be made of either aluminium bronze or copper beryllium.

Figure 3:
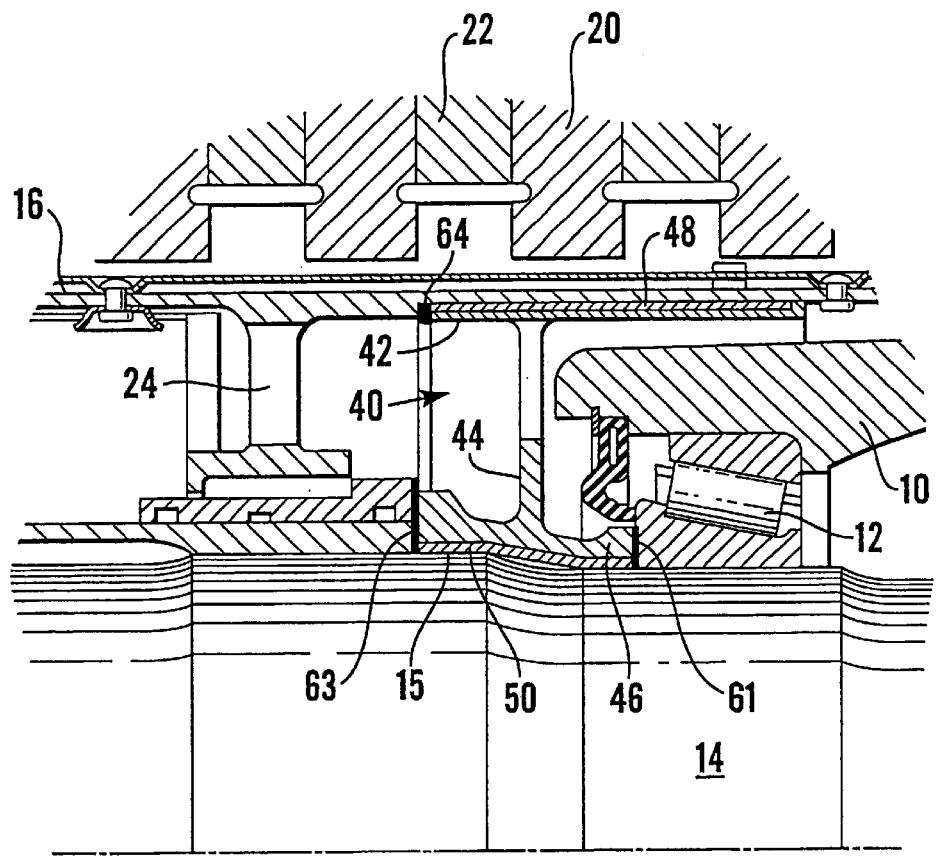
FIG. 3 is a view of part of FIG. 1 showing a brake assembly in accordance with the present invention.

As seen in FIG. 3, a resilient washer 61 is provided between the confronting axially facing surfaces of the portion 46 of spacer member 40 and the bearing means 12. Another washer 63 is provided between the other end face of the portion 46 and the pedestal 24. A third washer 64 optionally is provided between a radially outer face of the spacer member 40 and a confronting shoulder surface of the pedestal. The washers 61,63 also bear resiliently against respective ends of the support ring 50.

The spacer member 40 is now described in more detail with reference to FIG. 4, in which it is designated by the reference number 70. Spacer member 70 has a non-rigid radially outer portion 71 which in part 72 defines a non-cylindrical outer surface 73 that is deformable to bear resiliently against the inner diameter surface 17 of torque tube 16.

To aid assembly a part 74 of the length of the outer portion 61 which first enters the torque tube during assembly has a cylindrical outer surface. Optionally part 74 may be substantially non-deformable.

Figure 4:
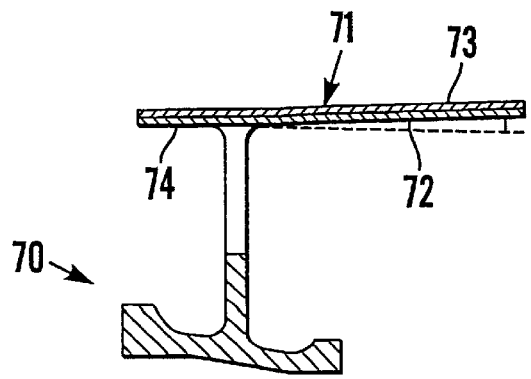
FIG. 4 is a sectional view of the spacer member of the brake assembly of FIG. 3.

The surface 73 of the non-cylindrical part 72 flares outwardly away from the part 74, at an angle A in the range 0.2° to 2°, to provide the concave section as seen in the cross-section view of FIG. 4. It can therefore act as a spring means to prevent or reduce relative movement against the torque tube (or pedestal extension). The outer portion 71 optionally may include a coating or sleeve as described above as item 48 in the context of the spacer member 40, e.g. to further prevent or reduce galling. The part 72 optionally may be axially slit (which term includes provision of axial cutouts) to comprise a series of axially extending resilient fingers 75 as shown in FIG. 5.

The resilient washers are each comprised by annular metallic type elements in order to withstand the high temperatures which can arise in operation of aircraft brakes. Suitable washers include Belleville springs which may be used singly, in series, in parallel or in combination of series and parallel as shown in FIG. 6a. Alternatively, for example, the washers may be wave type disc springs as shown in FIG. 6b and which may be used singly, in parallel, in series or in a series and parallel combination. Belleville and wave type springs may be used in combination between a pair of the confronting surfaces.

The provision of one or more of the resilient elements 61,63,64 assists in preserving axial loading at interface surfaces during braking operations, thereby reducing the conventional tendency for fretting/galling wear and providing an improved wear life.

What is claimed is:

1. A torque transmission device comprising:

a torque tube;

a plurality of stator type friction discs mounted on the torque tube;

an axle which extends coaxially relative to and within the torque tube for rotatably supporting a rotatable member which has associated therewith a plurality of rotor type friction discs arranged with said rotor discs each interposed between a successive pair of stator discs in a disc assembly which is axially compressible for torque transmission between the torque tube and the rotatable member;

an annular spacer member which extends radially between the axle and torque tube to provide radial support between the torque tube and axle; and said annular spacer member comprising a radially outer portion which at least in part defines a non-rigid, non-cylindrical outer surface region that is deformable to bear resiliently against the inner diameter surface of the torque tube.

2. A torque transmission device according to claim 1, wherein said radially outer portion comprises said deformable region and a substantially non-deformable region.

3. A torque transmission device according to claim 2, wherein the non-deformable region comprises a substantially cylindrical outer surface to confront and bear against a confronting inner diameter surface of the torque tube.

4. A torque transmission device according to claim 2, wherein said non-deformable region is at that end region of the radially outer portion which first enters the torque tube on assembly of the spacer member into the torque tube.

5. A torque transmission device according to claim 1, wherein substantially all of the radially outer portion is non-rigid.

6. A torque transmission device according to claim 1, wherein said non-rigid, non-cylindrical outer surface region comprises an outer surface which, in the absence of applied force, inherently flares outwardly in a direction away from that end region which first enters the torque tube during assembly.

7. A torque transmission device according to claim 6, wherein said flared portion extends at an angle in the range 0.1° to 7° relative to the longitudinal axis of the spacer member.

8. A torque transmission device according to claim 7, wherein said angle is in the range 0.2° to 2°.

9. A torque transmission device according to claim 6, wherein said non-cylindrical outer surface region is of a frusto-conical shape.

10. A torque transmission device according to claim 6, wherein as considered in axial cross-section the said outer surface is concave.

11. A torque transmission device according to claim 1, wherein the non-cylindrical outer surface region is circumferentially continuous.

12. A torque transmission device according to claim 1, wherein the non-cylindrical outer surface region is circumferentially discontinuous.

13. A torque transmission device according to claim 12, wherein said discontinuous region comprises a plurality of axially extending and circumferentially spaced slits.

14. An aircraft assembly comprising:

a torque tube;

an axle which extends coaxially relative to and within the torque tube;

a pack of brake discs including rotor discs mounted for rotation with the axle and alternating stator discs mounted on the torque tube, the disc assembly being axially compressible for producing braking torque transmission to the torque tube; and an annular spacer member which extends radially between the axle and torque tube to provide radial support between the torque tube and axle;

said annular spacer member comprising a radially outer portion which at least in part defines a non-rigid, non-cylindrical outer surface region that is deformable to bear resiliently against the inner diameter surface of the torque tube.

15. An aircraft wheel and brake assembly including a wheel rotatably mounted by bearing means carried by an axle, the assembly comprising:

a torque tube;

a plurality of stator type friction discs mounted on the torque tube;

an axle which extends coaxially relative to and within the torque tube for rotatably supporting a rotatable member which has associated therewith a plurality of rotor type friction discs arranged with said rotor discs each interposed between a successive pair of stator discs in a disc assembly which is axially compressible for torque transmission between the torque tube and the rotatable member;

an annular spacer member which extends radially between the axle and torque tube to provide radial support between the torque tube and axle; and said annular spacer member comprising a radially outer portion which at least in part defines a non-rigid, non-cylindrical outer surface region that is deformable to bear resiliently against the inner diameter surface of the torque tube.

16. Aircraft wheel and brake apparatus comprising:

an aircraft wheel supported for rotation by wheel bearing means on an axle;

torque tube means including a tubular part located about said axle and having an inner surface, said torque tube means further including an annular pedestal which extends radially inwards from said inner surface towards the axle for supporting the torque tube means relative to the axle;

a pack of brake discs including rotor discs mounted for rotation with said wheel and alternating stator discs connected to the torque tube means for axial compression of the pack to transmit braking torque from the wheel to the torque tube means via the discs; and an annular spacer member located about said axle between the annular pedestal and the wheel bearing means and extending radially between the axle and the inner surface of the tubular part of the torque tube means to provide additional radial support to the torque tube means;

said annular spacer member having a deformable portion defining a radially outer surface which, as made, is non-cylindrical and larger than said inner surface of the tubular part of the torque tube means and which during assembly of the apparatus has become deformed for the deformable portion to be received within and resiliently engaged with the inner surface of the tubular part of the torque tube.

* * * * *

UNITED STATES PATENT AND TRADEMARK OFFICE
CERTIFICATE OF CORRECTION

PATENT NO. : 6,296,084 B1
DATED : October 2, 2001
INVENTOR(S) : Trustee

It is certified that error appears in the above-identified patent and that said Letters Patent is hereby corrected as shown below:

<u>Title page,</u>
Item [73], Assignee: "Dunlop Limited" should be -- Dunlop Aviation Limited --.

Signed and Sealed this

Twentieth Day of August, 2002

*Attest:*

*Attesting Officer*

JAMES E. ROGAN
*Director of the United States Patent and Trademark Office*